United States Patent Office 3,232,691
Patented Feb. 1, 1966

1

3,232,691
DYEING WITH COPOLYMERIC DYES AND
CROSSLINKING THE LATTER
Hans Wilhelm, Ludwigshafen (Rhine), Gerd Louis, Frankenthal, Pfalz, and Guenter Lange, Ernst Penning, and Hans Weidinger, Ludwigshafen (Rhine), Germany, assignors to Badische Anilin- & Soda-Fabrik Aktiengesellschaft, Ludwigshafen (Rhine), Germany
No Drawing. Filed May 29, 1962, Ser. No. 198,442
Claims priority, application Germany, July 12, 1960,
B 58,569; June 8, 1961, B 62,816; July 29, 1961,
B 63,452; Aug. 1, 1961, B 63,469
13 Claims. (Cl. 8—1)

This application is a continuation-in-part of our copending application Serial No. 122,073, filed July 6, 1961, and now abandoned.

This invention relates to a process for the simultaneous dyeing and resin finishing of textiles according to which solutions or aqueous dispersions of colored and/or optically brightened interpolymer obtainable by copolymerization from chromophoric, possibly fluorescent, monomers, from monomers which bear reactive groups and optionally from other monomers customarily used for the production of plastics, are applied to the textile material and crosslinked under the conditions of condensation or addition reactions either alone or with the aid of further, at least bifunctional compounds.

Dispersions of high polymers, especially the so-called emuslion polymers, are used extensively for finishing textiles. As filling and stiffening finishes they impart to the fabrics treated withwith, depending on the requirements, handle, fullness, elasticity, weighting, stiffness, smoothness, non-slip properties or gloss. Besides urea and melamine condensates, polymer dispersions moreover occupy an important position in the field of resin finishing for example for improving the abrasion resistance of minimum-iron finishes. Examples are dispersions of polymers or copolymers of acrylic esters or vinyl esters, for example polyvinyl acetate dispersions in finely dispersed or coarsely dispersed condition, polyvinyl acetate dispersions containing plasticizer, dispersions of copolymers of vinyl acetate with vinyl chloride or vinylidene chloride, polyethyl or polybutyl acrylate dispersions or dispersions of copolymers of acrylic esters and styrene.

The said emulsion polymers may be used for improving a great variety of different textiles, as for example for finishing articles of cotton or rayon staple, such as materials for shirts, aprons, national costumes and occupational clothing, for the finishing of naps, furnishings, upholstery cloths, mattress ticking and cord fabrics, and also for stiffening curtaining or woollen clothing materials.

Besides these textile finishes, in which the permeability of the fabric to air is to be retained, polymer dispersions are also widely used for the surface coating of textiles, for example for the production of coated fabrics, protective clothing, oilcloths, lining materials, waterproof calico, iron-on and stiffening materials, non-skid rugs or for doubling fabrics, to which may be added a special mechanical aftertreatment, for example with embossing rollers or graining presses.

The use of emulsion polymers with condensable groups, for example N-methylol groups or N-methylol ether groups, has already been proposed for the said purpose; such emulsion polymers may be crosslinked with themselves or with the fiber by a suitable treatment, for example with acids or heat. Such treatments are usually carried out as after treatments separately from the dyeing process. They have the disadvantage that the shade of color of the dyed material is changed by such as aftertreatment.

It is an object of this invention to provide a process for the simultaneous dyeing and/or optical brightening and resin finishing of textiles.

Another object of the invention is to provide dyed and/or optically brightened textiles which are very fast to rubbing, washing and light.

A further object of the invention is to provide dyeings, possibly fluorescent dyeings, the fastness of which is not impaired by the finishing operation.

A further object of the invention is to provide textiles which exhibit excellent fastness properties and a very stable finish.

The said and other objects of the invention are achieved by treating textiles with copolymers which contain dyes, possibily fluorescent dyes, polymerized into the same and which contain groups capable of entering into crosslinking reactions with one another.

We have found that textile materials can be dyed and/or optically brightened very fast and provided with a very durable finish in one operation by applying thereto solutions or aqueous dispersions of colored or fluorescent colored or colorless polymers obtainable by copolymerization of chromophoric monomers (i.e., fluorescent or non-fluorescent dyes which contain a polymerizable olefinic group) with non-colored compounds containing groups which are accessible to condensation or addition reactions, and optionally with other polymerizable non-colored compounds customarily used for the production of plastics, and after the application of the said copolymers crosslinking them on the fiber, either alone, for example by heating and/or changing the pH, and/or with the aid of suitable bifunctional or higher polyfunctional compounds by condensation or addition.

The non-fluorescent or fluorescent dyes and the dyes producing optical brightening and containing polymerizable olefinic groups will hereinafter be referred to as chromophoric monomers, the polymerizable uncolored compounds bearing groups capable of entering into condensation or addition reactions as reactive monomers and the other polymerizable uncolored compounds usually employed for the production of plastics as inert monomers. By inert monomers there are therefore to be understood those which under the prevailing conditions of the crosslinking do not take part in the condensation or addition reaction.

For the preparation of the new copolymers there are suitable for example chromophoric monomers based on dyes of the azo, anthraquinone, triarylmethane, phthalocyanine, phenazine and oxazine series which contain a polymerizable group of the general formula:

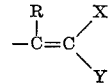

in which R denotes a hydrogen atom, a halogen atom, a short-chain alkyl, hydroxyalkyl, cyano, carboxy or carboxylic acid ester group, X a hydrogen atom, a halogen atom, an alkyl group, a substituted or unsubstituted aromatic radical and Y a hydrogen atom, a halogen atom or an alkyl group. Those dyes are preferred in which the substituent R is a hydrogen atom, a chlorine atom or a methyl group the substituent X is a hydrogen atom or a chlorine atom and the substituent Y is a hydrogen atom and in which the polymerizable group is attached to the remainder of the dye molecule by way of a phenylene, >C=O, >SO₂ or >NR' radical, R' denoting hydrogen or an alkyl radical. A number of such dyes is described for example in abandoned U.S. patent applications Serial No. 10,071, filed February 23, 1960, by Hans Krzikalla, Guenter Lange, Heinz Pohlemann and Guenter Krehbiel; Serial No. 10,078, filed February 23, 1960, by Julius Eisele, Wilhelm Federkiel, Guenter Krehbiel, Hans Krzikalla, Guenter Lange and Heinz Pohlemann; Serial No. 844,178, filed October 5, 1959, by Guenter Lange, Friedrich Ebel, Rudolf Schroedel and Walter Hensel; and Serial No. 105,267, filed April 25, 1961, by Guenter Krehbiel, Guenter Lange, Ernst Penning and Hans Wilhelm, German Patent No. 1,010,063, French Patent No. 1,118,705 and U.S. Patent No. 2,927,035.

Suitable fluorescent dyes, i.e., compounds which are capable of transforming visible or ultraviolet light into visible light of a greater wave length include polymerizable derivatives of stilbene, of fluorescent dyes of the triarylmethane series, of coumarin, of aminonaphthalic acid imide, of aminoterephthalic acid diamide and of azomonomethinecyanines.

By reactive groups which are available for condensation or addition reactions there are to be understood those which are not attacked under the conditions of the polymerization but which can be subsequently crosslinked by condensation or addition either indirectly, i.e., by adding bifunctional or higher polyfunctional substances having a crosslinking action, or directly, i.e., without adding these substances, for example by the action of heat or by altering the pH.

Groups which are available for indirect crosslinking by condensation or addition include carboxylic acid or precondensates which contain methylol or methylol ether groups and which are obtainable in known manner, for example from formaldehyde and urea, thiourea, melamine, guanidine, dicyandiamide or phenols (see for example B. Golding, "Polymers and Resins," D. van Nostrand Company, Inc., New York, 1959, pp. 242 ff., and "Amino Resins," Rheinhold, Plastics Application Series, 1959), amide, carboxylic acid imide, ureido, aminotriazine, dicyandiamide, carbamic acid, thiocarbamic acid, glyoxalmonoureine or glyoxal-diureine groups.

These groups enter into the known condensation reactions with bifunctional or higher polyfunctional compounds capable of condensation or addition, for example formaldehyde. Further indirectly crosslinkable radicals include carboxylic acid and carboxylic acid ester groups which may be condensed, for example with dihydric or higher polyhydric alcohols, amines, polyvalent epoxy compounds or hydroxides of polyvalent metals, or hydroxy or amino groups which are condensable, for example with divalent or higher polyvalent isocyanates. Suitable crosslinking agents include propylene glycol, glycerin, trimethylolpropane, pentaerythritol, neopentyl glycol, polyvinyl alcohol, ethylene diamine, diethylene triamine, dipropylene triamine, hexamethylene diamine, m-xylylene diamine, piperazine, hexamethylene di-isocyanate, toluylene di-isocyanate and triphenylmethane tri-isocyanate.

Groups which can be condensed directly, for example by the action of heat or by changing the pH, include aldehyde, chlorhydrin, epoxy, N-methylol and N-methylol ether groups. These groups may also be condensed indirectly.

Other suitable groups are those from which crosslinkable groups may be formed under the conditions of the polymerization, for example by reaction with the water used as the medium in an emulsion polymerization, such as glycidyl groups or acyloxy groups, which form hydroxy groups by hydrolysis, or acid anhydride groups, which are converted into carboxy groups.

The following are examples of compounds which bear, in addition to a polymerizable group, a crosslinkable radical of the kind specified: acrylamide, methacrylamide, N-methylolmethacrylamide, crotonamide, α-ethylacrylamide, α-chloroacrylamide, α-phenylacrylamide, maleic acid diamide, fumaric acid diamide, itaconic acid diamide, citraconic acid diamide, N-acryloylurea, N-methacryloylurea, compounds of the general formulae:

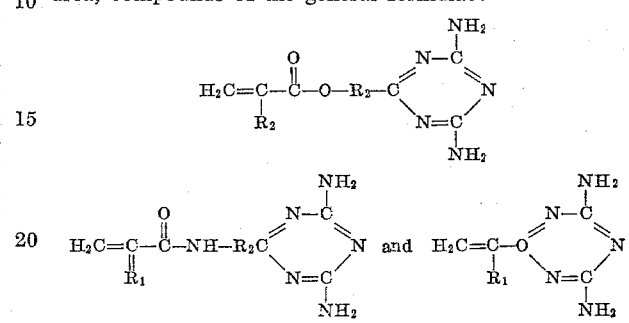

in which $R_1$ denotes a hydrogen atom or a methyl group and $R_2$ denotes a short-chain substituted or unsubstituted alkylene group, N-acryloyldicyandiamide, N-methacryloyldicyandiamide, carboxylic acid amide, carbamic acid and thiocarbamic acid derivatives, such as:

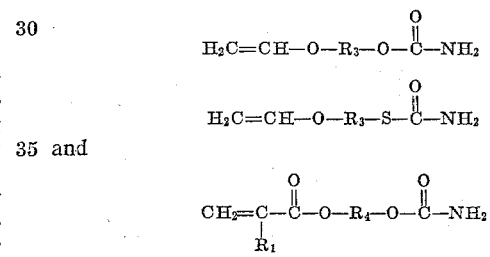

in which $R_3$ denotes a short-chain alkylene group or a cyclohexylene group, $R_4$ denotes a short-chain alkylene group or a phenylene group and $R_1$ has the meaning given above, monoamino-bis-(allyloxy)-triazines, diamino-allyloxy triazines and glyoxal-monoureine allyl ethers, glyoxal-diureine allyl ethers, glycidyl acrylate and butane-diol monoacrylate. In the copolymerization, further polymerizable compounds may be coemployed which bear no groups capable of condensation or addition or such groups as do not react under the conditions of the crosslinking reaction. Such inert monomers include aromatic vinyl compounds such as styrene and its polymerizable derivatives; polymerizable unsaturated hydrocarbons such as butadiene and isoprene; nitriles, amides, N-substituted amides, esters, anhydrides and salts of unsaturated polymerizable monocarboxylic or dicarboxylic acids, such as acrylic acid and its α- or β-substituted derivatives, such as methacrylic acid, crotonic acid, maleic acid, fumaric acid, itaconic acid or citraconic acid; vinyl esters of organic and inorganic acids, such as vinyl acetate, propionate or butyrate; vinyl halides, such as vinyl chloride and vinyl bromide; vinylidene halides; vinyl ethers; esters of allyl alcohol; vinylamines such as vinyl carbazole, vinylpyridine, vinylimidazole, vinylquinoline; vinyl lactams, such as vinylpyrrolidone, vinylcaprolactam or vinyl-caprylic lactam. These basic compounds are also suitable in the form of their quaternary salts as monomer components; moreover, quaternary salts of basic vinyl ethers, of acrylamides and methacrylamides substituted on the nitrogen atom by basic groups and of esters of basic alcohols and polymerizable carboxylic acids may also be used.

Polymerization may be carried out by the usual methods of, for example, solution, bulk, dispersion or, preferably, emulsion polymerization. In the case of emulsion polymerization the dispersions may be used directly for the process according to the invention.

As polymerization initiators those conventionally used for this purpose may be employed, for example, in the case of emulsion polymerisation, water-soluble peroxides, such as hydrogen peroxide, potassium persulfate, ammonium persulfate, redox systems, such as potassium persulfate sodium hydroxymethane sulfinate or mixtures of these substances, or water-insoluble peroxides, such as benzoyl peroxide, in the case of bulk, solution or suspension polymerization.

The usual emulsifiers and protective colloids, such as paraffin sulfonates, adducts of alkylene oxides to fatty oils, polyvinyl alcohol and the like, may also be used for polymerization in dispersion.

The polymers used according to this invention contain, depending on the requirements, as a rule 0.5 to 25% by weight, preferably 2.5 to 15% by weight of polymerized-in reactive monomers.

The amount of polymerized-in chromophoric monomers determines the depth of color of the copolymers. Some dyes effect intense coloration in amounts of less than 0.1% with reference to the total amount of monomers; when using other types of dye, up to 25% or more may be necessary. In general, monomer mixtures are used which contain 1 to 10% of dye. For the treatment of textile materials, dispersions are as a rule used which have a solids content of 5 to 60%, preferably 25 to 50% of these polymers.

The polymer may be crosslinked indirectly or directly, depending on the nature of the reactive groups. In general, crosslinking is effected at elevated temperatures and/or in the presence of catalysts which accelerate crosslinking. For reaction of amide groups with N-methylol groups or of N-methylol groups with each other, for example, such catalysts are alkaline-reacting or, preferably, acid-reacting inorganic or organic compounds, such as ammonium nitrate, ammonium chloride, phosphoric acid or its esters, maleic acid, tartaric acid, and similar substances customarily used in the condensation of methylol compounds. For reaction with epoxides, basic catalysts, such as dimethylaniline or piperdine, are preferred depending on the type of reactive groups contained in the copolymers, catalysts are usually employed, the pH of which does not initiate crosslinking at room temperature, but accelerates the crosslinking reaction upon heating. In the reaction of hydroxyl or amino groups with isocyanate groups, which may be present in the form of bisulfite addition products, it may be advantageous to add ammonium nitrite.

Textile materials which can be dyed according to the new process are especially natural or semisynthetic cellulose or other fibers which contain hydroxy groups, for example cotton, linen, regenerated cellulose or cellulose acetate. Other suitable textile materials are natural or synthetic nitrogenous fibers, for example wool, silk and polyamides. Polyvinyl alcohol fibers, polyacrylonitrile fibers and fibers of polyacrylonitrile copolymers also lend themselves admirably to dyeing by the process according to the invention. The said materials are given by way of example only and the list is not intended to be exhaustive. Thus, for example, mixtures of two or more types of fiber can also be dyed by the process. Textile materials which are present in the form of woven or knitted fabrics are preferred for the dyeing and simultaneous resin finishing.

The treatment of the fibrous materials with the colored polymers may be carried out in the usual apparatus such as padding machines, spreading machines, winch beeks or similar apparatus. The crosslinking catalysts and/or the polyfunctional compounds for indirect crosslinking, such as hexamethylene di-isocyanate, dimethylurea and the like, may be applied together with the polymers or separately from a second bath. Separate application is advantageous when the components slowly react with each other even when cold or when homogeneous distribution cannot be ensured. The impregnated fabric, after squeezing, is dried as a rule at 60° to 110° C. and then heated for example in a hotflue, in general to 110° to 200° C. The residence time depends on the speed at which the polymer crosslinks; it can be readily ascertained by a simple preliminary experiment and is as a rule at 125° C. 50 to 60 minutes and at 145° C. 15 to 20 minutes.

The process according to this invention permits to simultaneously dye and/or optically brighten and finish textiles in durable fashion. In contrast to dyeings and brightening effects which are obtained by conventional methods, the dyes and/or brightening agents applied to the fibrous material by the new process can only be removed chemically and mechanically with extreme difficulty; after the crosslinking reaction, the dye and finish form a unit that firmly encloses the fibers and can only be destroyed under extreme conditions. The finish and the dyeing or brightening effect are outstandingly resistant to normal and even rigorous mecahnical and chemical stress, as for example to abrasion, solvents and frequent washing.

The dye and finish are firmly combined and consequently no subsequent impairment of the shade of color by the finish can occur such as is often observed in the usual finishing processes.

By suitable choice of the initial materials used for the production of the copolymers, the polymers may also be largely adapted to requirements, for example as regards the shade of color and the handle of the textiles to be finished, so that the new process has wide applicability. Soft supple finishes can be obtained if plasticizing components, such as butyl acrylate, are used for the production of the polymers; if "hard" components, such as styrene or vinyl chloride, are polymerized in, an especially full handle is achieved.

When no special requirements are placed on the finish, the proportion of uncolored monomers (reactive and/or inert monomers) may be kept small in favor of the polymerizable dyes (chromophoric monomers). The process is then mainly applicable to washproof and abrasion-resistant dyeing and printing of the fibrous materials.

The colored and/or optically brightened copolymers may also be used together with other textile finishes such as urea, melamine, dicyandiamide or guanidine condensates with formaldehyde. Moreover, besides the said copolymers, other emulsion or solution polymers or emulsified highly polymeric natural substances, polymers, copolymers, polycondensates or polyaddition products may be used for the production of certain finishing effects. Mixtures of different colored polymers or of brightened and colored polymers may also be applied for purposes of shading. The new dyeing and/or brightening and finishing process may also be combined with a previous, simultaneous or subsequent treatment of the material to be finished and dyed, with water-soluble polymeric natural, semisynthetic or synthetic substances, such as starches, degraded starches, starch ethers, mucilages, cellulose ethers, alginates, vegetable gums, polymers or copolymers of unsaturated carboxylic acids or their salts, amides and other usual compounds, for example in order to make the fibrous materials hydrophilic.

According to the present invention, the textile material may also be finished by application of a coherent film, i.e., by coating. If desired, several such layers may be applied to the fabric to be coated; preferably only the uppermost layer is applied by the process according to this invention. The copolymers may also be applied by any of the methods customary in textile printing.

When fluorescent polymers are used for the treatment of the textiles they may themselves be either intensely colored and thus impart to the textiles a vivid brilliant coloration or they may themselves be uncolored or only faintly colored and then function as optical brightening agents. Special effects may be achieved by using the fluorescent copolymers in admixture with other colored copolymers. Dyeings may also be brightened optically in this manner. The fluorescent copolymers may also be used for the printing of textiles.

A special embodiment of the new process comprises preparing non-woven fabrics in which the colored or brightened copolymer acts at the same time as binding agent and dye. With the aid of embossing rollers or graining presses, artificial leather compositions with a great variety of patterns can be prepared.

The foregoing detailed description has been given for clearness of understanding only and no unnecessary limitations are be understood therefrom. The invention is not limited to the exact details shown and described, for obvious modifications will occur to those skilled in the art. The same is true for the following examples in which parts and percentages are units of weight.

*Example 1*

Washed cotton fabric is dipped in a mixture of 100 parts of water, 0.124 part of ammonium nitrate and 100 parts of at 41.3% aqueous polymer dispersion which has been obtained by polymerization of a mixture of 263 parts of butyl acrylate, 27 parts of N-methylolmethacrylamide and 1.25 parts of the azo dye obtained by coupling diazotized 1-amino-3-acryloylaminobenzene with 1-[N-(2-hydroxyethyl)-N-(2-cyanoethyl)-amino] - 3 - methylbenzene with the coemployment of 1.2 parts of potassium persulfate and 7.5 parts of the sodium sulfonate of the reaction product of about 25 moles of ethylene oxide and 1 mole of castor oil. The treated cotton fabric is squeezed off, stretched on a frame and dried for an hour at 130° C.

The increases in weight of four pieces of cotton fabric thus treated are for example 19.3%, 20%, 19.2% and 19.4%.

If the pieces of cotton fabric thus treated are boiled in a solution which contains in a liter of water 2 grams of curd soap and 1 gram of sodium carbonate, then washed with distilled water, dried and weighed, the following results are obtained:

| Period in minutes of wash at the boil | Change in weight with reference to finished cotton fabric, percent | Change in weight with reference to emulsion polymer taken up, percent |
|---|---|---|
| 20 | +0.294 | +1.75 |
| 2×20 | −0.034 | −0.215 |
| 3×20 | −0.052 | −0.32 |

The entirely homogeneous yellow dyeing of the pieces of fabric is unchanged in all the washed samples as compared with an unwashed sample.

*Example 2*

A mixture of 200 parts of water, 40 parts of butyl acrylate, 10 parts of acrylonitrile, 3 parts of methylolmethacrylamide, 7.5 parts of a 20% aqueous solution of the sulfation product of an oxyethylated fatty alcohol and 0.2 part of potassium persulfate is heated to 80° C. while stirring. When polymerization has begun, an emulsion consisting of 185 parts of water, 171 parts of butyl acrylate, 42 parts of acrylonitrile, 12 parts of methylolmethacrylamide, 6 parts of the coupling product of diazotized 1-acryloylamino-4-aminobenzene with 1-hydroxynaphthalene-4-sulfonic acid, 25 parts of a 20% aqueous solution of the sulfation product of an oxyethylated fatty alcohol and 1 part of potassium persulfate is added dropwise in the course of two hours. After all has been added, the reaction is completed by heating for one hour at 80° C. A 35% dispersion of a transparent red colored polymer is obtained.

A cotton fabric is soaked therewith, the excess dispersion squeezed off and the fabric dried on a stenter frame for 30 minutes at 140° to 145° C. The increase in weight of the fabric is about 15%. By washing twice as described in Example 1, the amount of polymer taken up decreases by 0.18%.

*Example 3*

A dispersion is prepared according to the description in Example 2, the dye specified therein being replaced by 6 parts of 1 - amino - 2 - acetyl - 4 - acryloylaminoanthraquinone.

A non-woven cotton fabric is impregnated therewith, carefully pressed out and dried for 30 minutes at 70° C. It is heated to 170° C. for 10 minutes for crosslinking. A violet colored bonded fabric is obtained.

*Example 4*

An emulsion is prepared from 350 parts of water, 193 parts of butyl acrylate, 64 parts of styrene, 18 parts of methylolacrylamide, 6 parts of N-methylol-acryloylurea, 15 parts of acryloylaminoazobenzene and 35 parts of a 20% aqueous solution of the sulfation product of an oxyethylated fatty alcohol.

250 parts of this emulsion is heated to 80° to 85° C. in the presence of 0.5 part of potassium persulfate. When polymerization has begun, the remainder of the emulsion is added dropwise in the course of two hours with powerful stirring, simultaneously with a solution of 1 part of potassium persulfate in 20 parts of water. After all has been added, another 0.25 part of potassium persulfate is added and the temperature kept at 80° C. for another hour. Then the residual monomers are distilled off azeotropically by heating to 90° to 95° C. 20 parts of coagulate is separated by filtration.

200 parts of the 35% dispersion obtained is mixed with 0.21 part of ammonium nitrate and a washed cotton fabric soaked therewith. After thorough pressing, the fabric is dried for 30 minutes at 140° C. A yellow colored material is obtained which loses less than 0.2% by weight of the polymers taken up when washed twice as described in Example 1.

*Example 5*

A mixture of 200 parts of water, 45 parts of ethyl acrylate, 5 parts of vinyl propionate, 2.1 parts of N-methylolmaleic acid imide, 7.5 parts of a 20% solution of the sulfation product of an oxyethylated fatty alcohol and 0.2 part of potassium persulfate is heated to 80° C. while stirring. After polymerization has been initiated, a mixture of 173 parts of water, 192 parts of ethyl acrylate, 21 parts of vinyl propionate, 9 parts of N-methylolmethacrylamide, 3 parts of N-methylol-maleic acid imide, 3 parts of the coupling product of diazotized 2-amino-5-acryloylamino - 1,4 - hydroquinone dimethyl ether with 2-hydroxynaphthalene and 25 parts of a 20% solution of the sulfation product of an oxyethylated fatty alcohol together with a solution of 1 part of potassium persulfate in 20 parts of water is allowed to flow in in the course of two hours. After all has been added, another 0.2 part of potassium persulfate is added and the temperature kept for another hour at 80° C. The residual monomers are then distilled off azeotropically at 90°-to 95° C. (12 parts) and the coagulate separated by filtration from the lilac colored 38.5% dispersion.

0.4 part of ammonium chloride is dissolved in 200 parts thereof and a rayon staple fabric is soaked with the mixture. After pressing out, the fabric is dried for an hour at 70° C. and then crosslinked by heating at 140° C. for ten minutes. The lilac colored fabric obtained loses only 0.28% of the polymer taken up when it is washed three times.

*Example 6*

A mixture of 200 parts of water, 48 parts of butyl acrylate, 2.5 parts of acrylonitrile, 5 parts of butane-diol monoacrylate, 7.5 parts of a 20% aqueous solution of the sulfation product of an oxyethylated fatty alcohol as emulsifier and 0.2 part of potassium persulfate is heated to 80° C. while stirring. After polymerization has started, a mixture of 173 parts of water, 198 parts of butyl acrylate, 10 parts of acrylonitrile, 22 parts of butane-diol monoacrylate, 25 parts of the above-mentioned emulsifier solution, 10 parts of an azo dye obtained by coupling diazotized 4-nitro-2-anisidine with N-butyl-N-acryloyloxyethylaniline, and 1 part of potassium persulfate is dripped in within 40 minutes. Then heating is continued for 80 minutes at 85° C. after adding another 0.2 part of persulfate, and the remainder of the monomers then distilled off. A stable, thinly liquid red dispersion is obtained which contains 35.3% of solid substance.

A solution of 29.3 parts of the potassium bisulfite compound of hexamethylene di-isocyanate and 100 parts of water is added to 250 parts of this dispersion and, after adding 0.9 part of sodium nitrite, a washed cotton fabric is impregnated therewith. The cloth is dried for 30 minutes at 70° C. and heated for another 30 minutes at 150° C. After washing out the sulfite formed by the crosslinking, the vermilion minimum-icon fabric, which has a soft, full handle, has been finished in a very washproof manner.

*Example 7*

224 parts of butyl acrylate, 35 parts of acrylonitrile, 27 parts of butane-diol monoacrylate and 10 parts of a dye obtained by coupling diazotized p-nitraniline with N-butyl-N-acryloyloxyethylaniline are polymerized as described in Example 6 in the presence of 32.5 parts of a 20% aqueous solution of the sulfation product of an oxyethylated fatty alcohol as emulsifier with 1.5 parts of potassium persulfate in 373 parts of water. A 30% red dispersion is obtained.

250 parts of this dispersion, mixed with a suspension of 27 parts of the potassium bisulfite compound of toluylene di-isocyanate in 150 parts of water, is used after adding 0.5 part of sodium nitrite, for impregnating a calico cloth which is then dried for 30 minutes at 70° C., then heated for 30 minutes at 150° C. and washed to remove the salt formed by the condensation. The fabric is dyed and finished in a washproof manner.

*Example 8*

A 36.2% polymer dispersion with active amide groups is obtained by polymerization of 355 parts of butyl acrylate, 45 parts of methacrylamide and 20 parts of the dye of Example 7 in 568 parts of water with 50 parts of the said 20% emulsifier solution and 2.5 parts of potassium persulfate.

An impregnating liquor, which contains 250 parts of this dispersion and a solution of 30 parts of the potassium bisulfite compound of hexamethylene di-isocyanate in 100 parts of water is used, after adding 0.5 part of ammonium nitrite as crosslinking catalyst, to impregnate a cotton fabric. The impregnated fabric is dried for 30 minutes at 70° C. heated at 150° C. for another 30 minutes to effect condensation and washed. The brilliant red fabric is dyed fast to washing and has a minimum-iron finish.

*Example 9*

250 parts of a 30.8% stable transparent dark red colored polymer dispersion prepared from 340 parts of butyl acrylate, 60 parts of methacrylamide and 19 parts of the azo dye of Example 7 in 568 parts of water with 50 parts of the said 20% emulsifier solution and 2.5 parts of potassium persulfate, is mixed with a solution of 15 parts of dimethylolurea in 100 parts of water and 0.3 part of ammonium nitrate. A non-woven cotton fabric is soaked with this dispersion, pressed out carefully and heated for 30 minutes at 150° C. to effect crosslinking. The fabric obtained is deep red.

*Example 10*

A solution of 30 parts of the N,N'-dimethylolated diurethane of butane-diol-(1,4):

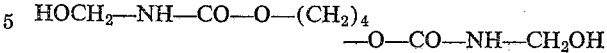

in 100 parts of water is added to 250 parts of the dispersion of the polymer with reactive amide groups obtained in Example 8. After adding 0.3 part of ammonium nitrate, this liquor is used to impregnate calico fabric; after heating the fabric at 150° C. for half an hour, it has an especially full soft handle and is characterized by an intense red color and at the same time crease resistance.

*Example 11*

A 30.2% polymer dispersion is prepared from 126 parts of butyl acrylate, 35 parts of acrylonitrile, 25 parts of acrylic acid, 9 parts of the azo dye of Example 7, 32.5 parts of the above-described 20% emulsifier solution, 373 parts of water and 1.5 parts of potassium persulfate.

3.5 parts of concentrated (about 28%) ammonium is added to 100 parts of this dispersion to neutralize the reactive carboxyl groups, and then 0.22 part of dimethyl aniline and 17.6 parts of a 66.5% emulsion of a reaction product containing at least two epoxy groups per molecule obtained from pentaerythritol and epichlorhydrin are added.

Samples of regenerated cellulose impregnated with this mixture and heated for half an hour at 150° C. are dyed a brilliant red fast to washing.

*Example 12*

210 parts of butyl acrylate, 65 parts of methyl methacrylate, 35 parts of ethyl acrylate, 35 parts of methacrylamide and 5.25 parts of the leuco compound of the following triphenylmethane dye:

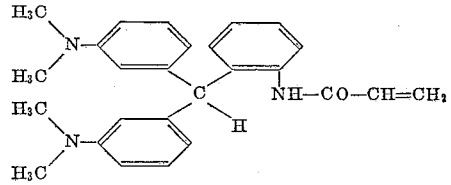

are polymerized in 300 parts of water with 50 parts of a 20% aqueous solution of the sulfation product of an oxyethylated fatty alcohol and 3 parts of potassium persulfate. A 50% emulsion, colored slightly green by partial oxidation of the leuco compound, is obtained which by acidification with acetic acid and introduction of air is oxidized to a dark green dye emulsion.

A mixture of 25 parts of this acetic acid emulsion, 1.75 parts of N,N'-dimethylol-butane-diol-(1,4)-diurethane, 0.75 part of tetramethylolacetylenediurea and 72.5 parts of water is padded onto washed cotton fabric and the fabric dried in the air. After condensation for 30 minutes at 125° C., the green colored finish adheres firmly to the fiber. When samples of the material thus finished are given an alkaline wash at the boil, the carbinol compound of the dye is partly formed so that the samples must be drawn through an acetic acid bath to restore the original shade.

*Example 13*

A 48.3% stable dispersion is prepared from 450 parts of butyl acrylate, 25 parts of N-methylol-methacrylamide, 25 parts of the water-soluble azo dye formed by coupling diazotized N-metharyloyl-m-phenylene diamine with 1-(2-chloro-5-sulfo)-phenyl-3-methylpyrazolone-(5), 50 parts of the 20% emulsifier specified in Example 12, 2.5 parts of potassium persulfate and 450 parts of water.

0.5 part of the 1:1 copolymer of acrylamide and methacrylamide, 8 parts of a 1:1 mixture of N,N'-dimethylolurea monomethyl ether and N,N'-dimethylolurea dimethyl ether, 0.3 part of diammonium phosphate, 0.3 part of ammonium phosphate, 0.2 part of a 55% aqueous solution of the sodium salt of sulfonated oleic acid hexamethylene-imide and 79.5 parts of water are added to 12 parts of the said dispersion. A cotton fabric is treated with this liquid. After heating at 130° C. for half an hour, the fabric has been dyed a washfast yellow and is crease-resistant.

Example 14

A 40% colored polymer dispersion is prepared from 225 parts of butyl acrylate, 30 parts of ethyl acrylate, 15 parts of methyl methacrylate, 15 parts of methacrylamide, 15 parts of the azo dye obtained by coupling diazotized 2,4-dichloraniline with N - (β-vinyloxy)-ethyl-N-ethylaniline, 50 parts of the 20% emulsifier solution specified in Example 12, 3 parts of potassium persulfate and 400 parts of water.

25 parts of the resultant yellow dispersion is mixed with 0.4 part of N,N'-dimethylol-butane-diol-(1,4)-diurethane, 0.5 part of N,N'-dimethylolurea, 0.5 part of ammonium nitrate, 0.2 part of a 55% aqueous solution of the sodium salt of sulfonated oleic acid hexamethyleneimide and 74 parts of water. Washed cotton fabric is soaked with this liquor, pressed out thoroughly and heated for half an hour at 130° C. The fabric has been dyed and finished in a washproof manner.

Example 15

A 49.4% yellow dispersion is prepared by polymerization of 450 parts of butyl acrylate, 25 parts of N-methylolmethacrylamide, 1.25 parts of a triazine:

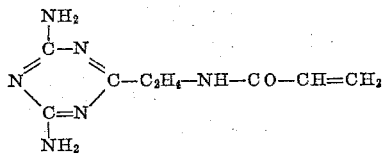

25 parts of the water-soluble azo dye obtained by coupling diazotized N-acryloyl-p-phenylene diamine with 1-(2-chloro-5-sulfo)-phenyl - 3 - methylpyrazolone - (5), 50 parts of the 20% emulsifier solution specified in Example 12, 2.5 parts of potassium persulfate, 2.5 parts of sodium pyrophosphate and 450 parts of water.

Washed cotton fabric is soaked with a mixture of 50 parts of the resultant emulsion, 1.5 parts of a 1:1 copolymer of acrylamide and methacrylamide, 20 parts of dimethylolurea, 0.5 part of diammonium phosphate, 0.5 part of ammonium nitrate and 100 parts of water, pressed out and heated for 30 minutes at 130° C. The fabric has been dyed brilliant yellow and is crease-resistant.

Example 16

A 47.8% yellow dispersion is prepared by polymerization of 450 parts of butyl acrylate, 25 parts of N-methylol-methacrylamide, 25 parts of the water-soluble azo dye obtained by coupling diazotized N-acryloyl-m-phenylene diamine with 1-(2-chloro-5-sulfo)-phenyl-3-methyl-pyrazolone-(5) in 450 parts of water with 50 parts of the 20% emulsifier solution specified in Example 12. 3 parts of potassium persulfate and 2.5 parts of sodium phosphate.

A bath which contains 8 parts of this dispersion, 8.4 parts of a 1:1 mixture of N,N'-dimethylol-urea monomethyl ether and N,N'-dimethylol-urea dimethyl ether, 0.4 part of a 1:1 copolymer of acrylamide and methacrylamide, 0.3 part of diammonium phosphate, 0.3 part of ammonium nitrate, 0.2 part of a 55% aqueous solution of the sodium salt of sulfonated oleic acid hexamethylene imide and 83 parts of water is padded onto washed cotton fabric; after heating for half an hour at 130° C., the yellow finish, which imparts especially good crease resistance to the fabric, is fixed in a washproof manner.

Example 17

A 38.8% yellow dispersion is obtained by copolymerization of 370 parts of butyl acrylate, 30 parts of acrylamide, 30 parts of the water-soluble azo dye of Example 15 and 454 parts of vinyl chloride with 5 parts of potassium persulfate in 867 parts of water with an addition of 5 parts of sodium pyrophosphate and 133 parts of a 15% aqueous soap solution the active components of which are the sodium salts of oxyoctadecane sulfonic acid and octadecane sulfonic acid in the ratio 1:1.

A mixture of 35 parts of this dispersion, 5 parts of N,N'-dimethylolurea, 0.5 part of ammonium nitrate, 0.2 part of a 55% aqueous solution of the wetting agent specified in Example 16 and 60 parts of water is padded onto washed cotton fabric. After heating for half an hour at 130° C., samples of the material have a minimum-iron finish and are dyed a brilliant yellow. The finish is characterized by especially high fastness to washing.

Example 18

50 parts of water, 10 parts of a 20% aqueous solution of the adduct of 25 moles of ethylene oxide to 1 mole of sperm oil alcohol and 20 parts of a 50% aqueous solution of ammonium nitrate are added to 300 parts of an about 40% aqueous dispersion of a copolymer of 72% of butyl acrylate, 15% of methyl methacrylate, 10% of methacrylamide and 3% of the red dye specified in Example 2. 600 parts of heavy gasoline (hydrocarbon mixture with a boiling range of 140° to 220° C., flashpoint 30° according to Abel Pensky and content of aromatics below 15%) is introduced while stirring with an impeller (speed 3,000 to 6,000 r.p.m.). After stirring in 20 parts of an about 70% aqueous solution of an etherified urea-formaldehyde precondensate, a cotton fabric is printed with the resultant printing paste on a roller printing machine. The printed fabric is dried at about 50° C. and then fixed for five minutes at 140° C. The print has good fastness to rubbing and washing.

Example 19

150 parts of a mixture of 40 parts of aluminum sulfate, 30 parts of tartaric acid and 80 parts of a 6% tragacanth thickening are added to 300 parts of an about 40% aqueous dispersion of a copolymer of 70% of butyl acrylate, 15% methyl methacrylate, 10% of methacrylamide and 5% of the yellow dye specified in Example 15. Then 20 parts of a 50% solution of the sodium salt of the acid sulfuric acid ester of the adduct of 80 moles of ethylene oxide to 1 mole of sperm oil alcohol, 510 parts of an emulsion thickening and 20 parts of an about 70% solution of an etherified urea-formaldehyde precondensate are added thereto.

The emulsion thickening used is composed of 3% of a 6% aqueous tragacanth solution, 1% of a 50% solution of the sodium salt of the acid sulfuric acid ester of the adduct of 80 moles of ethylene oxide to 1 mole of sperm oil alcohol, 18% of water and 78% of heavy gasoline (properties as in Example 18).

A fabric previously padded with an alkaline solution of o-naphthoic acid anilide is printed with the resultant reserve printing paste, dried and fixed for five minutes at 90° C. Then dyeing is effected with a solution of diazotized N-(p-methoxyphenyl)-p-phenylene diamine in the usual way. A brilliant reserve print with good fastness properties is obtained.

Example 20

20 parts of a 50% aqueous solution of the adduct of 25 moles of ethylene oxide to 1 mole of sperm oil alcohol, 540 parts of the thickener emulsion specified in Example 19, 100 parts of a mixture of 50 parts of the sodium salt of hydroxymethane sulfinic acid and 50 parts of a 6% tragacanth solution, 20 parts of a 50% aqueous solution of ammonium nitrate and 20 parts of an about 70% aqueous solution of an etherified urea-formaldehyde resin are added to 300 parts of an about 40% aqueous dispersion of a copolymer as in Example 19.

A cotton fabric dyed substantively black is printed with this printing paste and after drying steamed for ten minutes at about 100° C. A brilliant discharge print with good fastness properties is obtained.

*Example 21*

A cotton fabric is soaked with a polymer solution, prepared as described below, and the excess is then allowed to drip off. After drying at 35° C. crosslinking is effected for 30 to 45 minutes at 130° to 140° C. Cloth with a permanent yellow dyeing is obtained.

The polymer solution is prepared with 75 parts of butyl acrylate, 10 parts of acryl amide, 15 parts of methyl methacrylate, 20 parts of butanediol monoacrylate, and 6 parts of the coupling product of diazotized 2,4-dichloroaniline with N-ethyl-N-β-vinylhydroxyethylaniline in 180 parts of ethanol with 1.5 parts of azo diisobutyronitrile at 80° C. It is diluted with 300 to 450 parts of ethanol and then mixed with 10 parts of hexamethylene diisocyanate.

*Example 22*

A dye liquor, prepared as described below, is mixed with 1 part of piperidine, and then applied to a fibrous web composed of regenerated cellulose and dried for 24 hours at 80° to 90° C. A bonded non-woven fibrous material dyed red-yellow with good fastness to washing and solvents is obtained.

The polymer solution is prepared with 10 parts of methyl methacrylate, 54.5 parts of butyl acrylate, 35.5 parts of acrolein, and 5 parts of the dye formed by coupling of diazotized 2,4-dichloroaniline with N-β-acryloyl-hydroxyethyl-N-ethylaniline, in 50 parts of toluene and 50 parts of ethanol at 60° to 100° C. with the aid of 1.5 parts of azodiisobutyronitrile. It is then mixed with 30 parts of glycol bisacetoacetate and 0.1 part of phosphoric acid, and diluted with 300 to 500 parts of ethanol. An alternative method is to impregnate without addition of piperidine to the liquor, and to apply the amine to the fibrous material from a second bath or by spraying after the predrying. When this method is used, the residual liquor does not become useless as a result of coagulation.

*Example 23*

A cotton fabric is soaked with a 15% polymer solution, prepared as described below, then predried at 80° C. at low pressure and finally treated for 10 minutes at 150° to 160° C. The treated fabric has a wash-fast blue-violet dyeing and finish.

The polymer solution is prepared by heating a solution of 52 parts of butyl acrylate, 12 parts of methacrylamide, 4 parts of N-methylol methacrylamide, 10 parts of vinyl propionate, and 2 parts of 1-acryloylamino-5-benzoyl-amino-anthraquinone in a mixture of 100 parts of butanol and 20 parts of toluene in the presence of 0.2 part of tert. butyl perbenzoate and 0.2 part of dilauroyl peroxide in a nitrogen atmosphere for 8 hours at 80° to 85° C. A 38.2% red polymer solution is obtained, which is mixed with 0.5 g. of 85% phosphoric acid and further diluted, if necessary.

*Example 24*

A polymer solution mixed with phosphoric acid and prepared as described below is mixed with a solution of 15 parts of the tetrabutyl ether of tetramethylol acetylene di-urea in 250 parts of isopropanol, and a linen fabric is soaked with this polymer solution. After drying at 70° C. at reduced pressure and after the cross-linking reaction carried out at 150° C. for 15 to 20 minutes, a material dyed in a wash-fast and solvent-fast blue-violet shade and finish is obtained.

The polymer solution is prepared with the same quantities and the same starting materials as indicated in Example 23, except that a different dye, viz. the isobutyl ester of 1-amino-4-acryloylamino-anthraquinone-2-carboxylic acid, and 0.6 part of azodiisobutyronitrile in place of the initiator mixture mentioned in Example 23 were used.

*Example 25*

A mixture of 45 parts of a 25% polymer solution, prepared as described below, 0.4 part of the tetrabutyl ether of tetramethylol-acetyl di-urea, 0.5 part of glacial acetic acid, and 54 parts of alcohol is padded on to washed calico cloth. After heating for ½ hour at 120° C., the fabric is dyed in a wash-fast green-blue shade and finished.

The polymer solution is prepared with 60 parts of butyl acrylate, 15 parts of methyl methacrylate, 5 parts of N-methylol methacrylamide, 2 parts of a copper phthalocyanine dye with 4 sulphonic acid groups, of which 2 have been reacted with N-acryloyl-p-phenylenediamine, and 18 parts of vinyl pyrrolidone with 1.0 part of azodiisobutyronitrile in 123 parts of toluene and 110 parts of ethanol.

*Example 26*

Cotton fabric is impregnated with a solution of 10 parts of the precipitation polymer described below, 1.0 part of tetramethylol acetylene di-urea, and 0.5 part of ammonium nitrate in 89 parts of water. When the cloth has been heated for ½ hour at 130° C., the yellow finish is fixed fast to washing and solvents.

The yellow, water-soluble precipitation polymer is obtained by copolymerization of 70 parts of acrylamide, 20 parts of ethyl acrylate, 5 parts of N-methylol methacrylamide, and 5 parts of the azo dye indicated in Example 22 with 1 part of benzoyl peroxide in 900 parts of butanol. The polymer is extracted with ethyl acetate.

*Example 27*

37.5 g. of butyl acrylate is added, with stirring, in the course of 15 minutes to a solution containing 192 parts of water, 1.0 part of sodium pyrophosphate, 0.15 part of potassium persulfate, 5 parts of the 20% aqueous solution of the sodium salt of a sulfonated reaction product of 1 mole of isooctylphenol and 25 moles of ethylene oxide, and 1.0 part of a 50% aqueous solution of the sodium salt of sulfonated castor oil at 80° C. When polymerization has commenced, a mixture containing 209.5 parts of water, 150 parts of butyl acrylate, 7.5 parts of N-methylol methacrylamide, 2.5 parts of methacrylamide, 15 parts of a 20% aqueous solution of emulsifying agent, i.e., the sodium salt of the sulfonated reaction product of 1 mole of sperm oil alcohol and 25 moles of ethylene oxide, and 2.5 parts of 4,6-dimethyl-7-acryloyl-hydroxyethyl-amino-coumarin

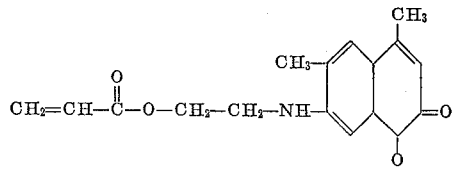

is added dropwise. A solution of 1.5 parts of potassium persulfate in 50 parts of water is slowly added simultaneously. When the solutions have been united, the mixture is heated for 1 hour to 80–85° C., the unreacted monomers are removed by steaming, and any coagulate that may have formed is filtered off.

97 parts of this 23.6% dispersion is mixed with 2.5 parts of the dimethylol compound of butanediol-(1,4)-diurethane (85% in water), 0.5 part of ammonium nitrate and 0.1 part of a 55% aqueous solution of the sodium salt of sulfonated hexamethylenimide of oleic acid. After dilution with 75 parts of water, the mixture is padded on cotton fabric. Drying at 70–80° C. is followed by curing for 30 minutes at 140° C. A fabric is obtained whose strongly fluorescent finish withstands alkaline washing at the boil.

The fluorescent dye was produced from 4,6-dimethyl-7-β-hydroxyethylaminocoumarin by esterification with acrylic acid.

Example 28

A solution of 0.8 part of N-methylolmethacrylamide, 22 parts of butyl acrylate, 0.3 part of azodiisobutyronitrile, 33 parts of ethanol and 1.2 parts of water is heated to 80° C. in a nitrogen atmosphere.

As soon as polymerization occurs this solution is combined, over a period of 60 minutes, with a solution of 41 parts of butyl acrylate, 1.8 parts of N-methylolmethacrylamide, 1 part of 4,6-dimethyl-2-acryloylhydroxyethylamino coumarin, 53 parts of ethanol and 2.8 parts of water, while a solution of 1 part of azodiisobutyronitrile in 10 parts of ethanol is run into the reaction mixture separately at the same time. When the three solutions have been combined, polymerization is completed by heating at boiling temperature for one hour.

A cotton fabric is soaked with this polymer solution, squeezed off and dried at room temperature. The fabric is then soaked with 100 parts of an aqueous solution of 2.1 parts of the di-N-methylol compound of butanediol-1,4-diurethane, 0.5 part of ammonium nitrate and 0.3 part of the sodium salt of sulfonated oleic acid hexamethylamide. The fabric is again squeezed off and then heated at 140° C. for one hour.

A wash-fast finish with optical brightening effect is obtained.

We claim:

1. A process for the simultaneous dyeing and finishing of a textile which comprises: applying to said textile an interpolymer obtained by addition polymerization through the olefinically unsaturated groups thereof of
   (A) a chromophoric monomer which is a dye containing a polymerizable group selected from the class consisting of acryloyl and methacryloyl, and
   (B) at least one uncolored, olefinically unsaturated, polymerizable compound including at least one reactive monomer selected from the class consisting of acrylamide, methacrylamide, maleic acid diamide, N-acryloylurea, N-methacryloylurea, and the N-methylols and N-methylol ethers of said amides and ureas, and crosslinking said interpolymer after application to said textile by a condensation reaction involving the reactive groups selected from the class consisting of the amide, urea, N-methylol and N-methylol ether groups of said monomer component (B).

2. A process as claimed in claim 1 wherein said dye is an azo dye.

3. A process as claimed in claim 1 wherein said dye is an anthraquinone dye.

4. A process as claimed in claim 1, wherein the interpolymer is applied as a dispersion which has a solids content of 5 to 60% by weight based on the total dispersion.

5. A process as claimed in claim 4, wherein the dispersion has been directly obtained by emulsion polymerization.

6. A process as claimed in claim 1, wherein the content of chromophoric monomer is 0.1 to 25% by weight and the content of reactive monomer 0.5 to 25% by weight based on the total amount of monomer.

7. A process as claimed in claim 6, wherein the chromophoric monomer is fluorescent.

8. A process as claimed in claim 7, wherein the fluorescing chromophoric monomer is an optical brightener.

9. A process as claimed in claim 1, wherein the interpolymer contains, in addition to said copolymerized chromophoric and reactive monomers, at least one additional copolymerized monomer selected from the group consisting of vinyl halides, aromatic vinyl compounds, unsaturated hydrocarbons, vinyl esters, unsaturated carboxylic acids and esters thereof, vinyl ethers, esters of alkyl alcohol, N-substituted vinylamines and vinyllactams.

10. A process as claimed in claim 1, wherein crosslinkable, at least bifunctional compounds are applied to the textile material before, during and after application of the interpolymer.

11. Dyed and finished textiles obtained by the process claimed in claim 1.

12. Dyed and finished textiles obtained by the process claimed in claim 9.

13. Dyed and finished textiles obtained by the process claimed in claim 10.

References Cited by the Examiner

UNITED STATES PATENTS

| | | |
|---|---|---|
| 1,500,844 | 7/1924 | Plauson. |
| 2,473,403 | 6/1949 | Woodward. |
| 2,632,004 | 3/1953 | Minsk et al. |
| 2,927,035 | 3/1960 | Wegmann et al. |
| 3,072,454 | 1/1963 | Long et al. |

FOREIGN PATENTS

| | | |
|---|---|---|
| 1,118,705 | 7/1956 | France. |
| 1,010,063 | 7/1957 | Germany. |

NORMAN G. TORCHIN, *Primary Examiner.*

ABRAHAM H. WINKELSTEIN, *Examiner.*